(12) United States Patent
Eckl et al.

(10) Patent No.: US 9,819,011 B2
(45) Date of Patent: Nov. 14, 2017

(54) ELECTRODE MATERIAL FOR A LITHIUM CELL

(71) Applicant: Robert Bosch GmbH, Stuttgart (DE)

(72) Inventors: Thomas Eckl, Leonberg (DE); Anika Marusczyk, Gelsenkirchen (DE); Malte Rolff, Leonberg (DE); Ingo Kerkamm, Stuttgart-Rohr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 134 days.

(21) Appl. No.: 14/570,562

(22) Filed: Dec. 15, 2014

(65) Prior Publication Data

US 2015/0171427 A1   Jun. 18, 2015

(30) Foreign Application Priority Data

Dec. 16, 2013  (DE) .................. 10 2013 226 011

(51) Int. Cl.
| | | |
|---|---|---|
| *H01M 4/1391* | (2010.01) | |
| *H01M 4/525* | (2010.01) | |
| *H01M 4/505* | (2010.01) | |
| *H01M 4/04* | (2006.01) | |
| *H01M 4/36* | (2006.01) | |
| *C01G 53/00* | (2006.01) | |
| *H01M 10/0525* | (2010.01) | |

(52) U.S. Cl.
CPC .......... *H01M 4/1391* (2013.01); *C01G 53/50* (2013.01); *H01M 4/043* (2013.01); *H01M 4/0404* (2013.01); *H01M 4/364* (2013.01); *H01M 4/505* (2013.01); *H01M 4/525* (2013.01); *H01M 10/0525* (2013.01); *H01M 2220/20* (2013.01); *Y02E 60/122* (2013.01)

(58) Field of Classification Search
CPC .... H01M 4/1391; H01M 4/525; H01M 4/505; H01M 4/0404; H01M 4/043; H01M 4/364; H01M 2220/20; H01M 10/0525
See application file for complete search history.

(56) References Cited

U.S. PATENT DOCUMENTS

| | | | |
|---|---|---|---|
| 2009/0233176 A1* | 9/2009 | Kita | ............ H01M 4/131 429/231.95 |
| 2011/0059349 A1 | 3/2011 | Lampe-Onnerud et al. | |
| 2011/0086273 A1 | 4/2011 | Ravet et al. | |
| 2012/0045694 A1* | 2/2012 | Park | ............ C01G 45/1228 429/220 |

FOREIGN PATENT DOCUMENTS

| | | |
|---|---|---|
| DE | 600 31 019 | 5/2007 |
| DE | 60 2005 003645 | 11/2008 |
| DE | 600 37 609 | 1/2009 |
| EP | 0 885 845 | 12/1998 |

OTHER PUBLICATIONS

Shannon, http://abulafia.mt.ic.ac.uk/shannon/ptable.php, as of Dec. 10, 2013.

* cited by examiner

*Primary Examiner* — Jane Rhee
(74) *Attorney, Agent, or Firm* — Norton Rose Fulbright US LLP; Gerard Messina

(57) ABSTRACT

An electrode material for an electrochemical energy store, in particular for a lithium cell, includes at least one first lithiatable active material, which is based on a transition metal oxide, and at least one second lithiatable active material, which is based on a doped transition metal oxide, the doped transition metal oxide of the second lithiatable active material being doped with at least one redox-active element. Also described is a method for manufacturing an electrode of this type.

27 Claims, No Drawings

ELECTRODE MATERIAL FOR A LITHIUM CELL

RELATED APPLICATION INFORMATION

The present application claims priority to and the benefit of German patent application no. 10 2013 226 011.3, which was filed in Germany on Dec. 16, 2013, the disclosure of which is incorporated herein by reference.

FIELD OF THE INVENTION

The present invention relates to an electrode material and a method for manufacturing such an electrode material as well as an electrochemical energy store.

BACKGROUND INFORMATION

Presently, the electrification of automobiles is being strongly promoted, in particular lithium-ion batteries being the focus of research. In order to be of interest for the consumer, batteries must guarantee a long service life (>10 years) when used in electric cars. This means that the cell voltage and the energy freed during discharging should still be at approximately ≥90% of the output values even after 10 years. In particular so-called high-energy materials such as the high-energy NCM ($LiMO_2:Li_2MnO_3$ where M=Nickel (Ni), cobalt (Co), manganese (Mn)) so far do not yet fulfill these requirements. Although so far the HE-NCM supplies high start voltages, in the course of its service life it shows a significant loss of voltage (voltage fade) along with a drop in capacity (capacity fade). For this reason, HE-NCM, which is generally of high interest, is so far not suitable for commercial use.

It is understood that it is generally conceivable to dope redox-inactive elements such as Mg(II) and Sn(IV), which show no change in the oxidation stage and no migration inside the material during cyclization and thus stabilize the structure of the material in order to reduce the voltage fade. Dopings of HE-NCM with Mg and Sn are known from the literature. Although introducing redox-inactive elements reduces the drop in voltage and capacity over time, this is tied to an undesirable loss in start capacity and start voltage of the cell.

SUMMARY OF THE INVENTION

An object of the present invention is thus to prevent (or at least drastically reduce) voltage fade in order to in this way increase the service life of a lithium-ion cell or battery, in particular of an HE-NCM lithium-ion-battery.

DETAILED DESCRIPTION

The present invention is directed to an electrode material, for example a cathode material for an electrochemical energy store, in particular a lithium cell, including:
  at least one first lithiatable active material, which is based on a transition metal oxide, and
  at least one second lithiatable active material, which is based on a doped transition metal oxide,
the doped transition metal oxide of the second lithiatable active material being doped with at least one redox-active element.

The present invention is furthermore directed to an electrode material for an electrochemical energy store, in particular for a lithium cell, obtainable by synthesis of at least one first lithiatable active material, which is based on a transition metal oxide, having
  at least one second lithiatable active material, which is based on a doped transition metal oxide,
the doped transition metal oxide of the second lithiatable active material being doped with at least one redox-active element.

The present invention is furthermore directed to an electrode, in particular a cathode for an electrochemical energy store, in particular a lithium cell, including at least one such electrode material.

Within the sense of the present invention, an electrochemical energy store may be understood to mean, in particular, any battery. In addition to a primary battery, an energy store may in particular include above all a secondary battery, i.e., a rechargeable accumulator. A battery may include or be a galvanic element or multiple of mutually connected galvanic elements. For example, an energy store may include a lithium-based energy store, such as a lithium-ion battery. A lithium-based energy store, such as a lithium-ion battery, may be understood to mean in particular such an energy store whose electrochemical processes during a charging or discharging process are at least partially based on lithium ions. Such an energy store may be used as a battery for laptops, PDAs, cell phones, and other consumer applications, power tools, gardening tools, as well as hybrid vehicles, plug-in hybrid vehicles and electric vehicles.

A lithium cell is in particular understood to mean an electrochemical cell of which the anode (negative electrode) includes lithium. This may, for example, be a lithium-ion-cell, a cell of which the anode (negative electrode) includes an intercalation material, for example graphite and/or silicon, in which lithium is reversibly insertable and removable, or a lithium-metal cell, a cell having an anode (negative electrode) made from metallic lithium or a lithium alloy.

Within the sense of the present invention, the active material is further understood to mean a material which in particular is involved in a charging process or discharging process and which thus may constitute the active material per se. Generally, a suitable conductive additive may be situated in the electrode material along with the active material or the active materials as such, which may in particular be from the group of elemental carbons, for example, carbon black, graphite, nanotubes, and a suitable binder, which may in particular include natural or synthetic polymers from the group of, for example, PVDF (polyvinylidenfluoride), alginates, styrene-butadiene rubber (SBR), polyethylene glycol, polyethyleneimine.

A lithiatable material is in particular understood to mean a material which may reversibly take up and release lithium ions. For example, a lithiatable material may be intercalatable with lithium ions and/or may be alloyed with lithium ions and/or may take up and release lithium ions during phase transformation. For example, the lithiatable electrode active material may be an electrode active material which is intercalatable with lithium ions. The lithiatable electrode active material may thus be referred to as an active storage material. If a lithium ion (Li+) and an electron are present at the same time, the electrode active material may, for example, store the lithium ion, also referred to as intercalation, and release it again as a function of the voltage, also referred to as deintercalation.

A transition metal oxide may in particular be understood to be a substance category which includes the oxygen compounds of the transition metals. Transition metals are elements with the atomic numbers 21-30, 39-48, 57-80 and 89-112 in the periodic table of elements.

Within the meaning of the present invention, a redox-active element is in particular understood to mean that the element changes its oxidation stage during charging and/or discharging within a range of, for example, 2.0 V-4.8 V, i.e., an oxidation or reduction.

Doping refers to the replacement of an element with another element in a chemical compound. Here, within the meaning of the present invention, which may be a complete or proportional replacement of a transition metal element (see above) with another transition metal element in a transition metal oxide is meant.

The first and the second lithiatable active material may each be present in the form of layered oxides. After the synthesis of the electrode material and in particular prior to the first forming cycle they may be present as individual components in the electrode material, for example, as a type of "layer-layer-mixture."

The first and the second lithiatable active material may, however, also be present at least partially as individual components in the electrode material after the activation of the second lithiatable active material by forming, or exceeding a voltage of 4.4 V. The first and the second lithiatable active material may, however, be at least partly present as a new composite material as a function of the synthesis conditions, in particular after the first forming cycle. In other words, this means that the electrode material according to the present invention may no longer include a type of mixture (solid solution, or similar) of the two individual components, but a new compound of the first and the second lithiatable active material. It is also conceivable that the electrode material includes a mixture of the first and the second lithiatable active material as well as a compound of the first and the second lithiatable active material. All of these embodiments are not to depart from the scope of the present invention.

The present invention is based on the finding that when the second lithiatable active material or the doped transition metal of the second lithiatable active material is activated, oxygen defect occur in the electrode material, which facilitate the migration of transition metals and thus the voltage fade explained above, for example, by accumulating transition metals on the lithium layer. The electrode material according to the present invention thus has the advantage that by providing at least one redox-active element during activation of the second lithiatable active material, or the doped transition metal of the second lithiatable active material, i.e., during the first forming cycle in which the electrochemically inactive second lithiatable active material is activated, less oxygen is irreversibly split off than in an undoped material or a material doped with a redox-inactive element. This stabilizes the structure and thus the voltage, since fewer defects occur in the electrode material via which the transition metals later migrate and are thus able to change or destabilize the structure. Thus an electrochemical energy store having a longer service life may be provided, or a lithium-ion accumulator including a doped HE-NCM cathode and a graphite anode, which has a voltage or capacity retention of 97.5% after 3,000 charging and discharging cycles compared to its initial values after the forming.

It is furthermore advantageous if the first lithiatable active material is based on the general chemical formula $Li(Ni_xCo_yMn_{1-x-y})O_2$, where x is in a range of greater than or equal to 0 to less than or equal to 1, and y is in a range of greater than or equal to 0 to less than or equal to 1, x may be in a range of greater than or equal to 0.2 to less than or equal to 0.8, and y being in a range of greater than or equal to 0 to less than or equal to 0.5, and most particularly x being in a range of greater than or equal to 0.3 to less than or equal to 0.45 and y being in a range of greater than or equal to 0.2 to less than or equal to 0.35. Here, the active material may be based on a nickel-cobalt-manganate (NCM), for example $LiMn_{1/3}Ni_{1/3}Co_{1/3}O_2$. The first lithiatable active material may furthermore have a doping, such as, for example, the dopings known from the literature with low proportions of Sn(IV) and/or Mg(II) or with redox-active elements such as W(IV), Nb(IV), Mo(IV), for example. It is furthermore advantageous if the second lithiatable active material is based on a doped manganese-oxide, in particular if the second lithiatable active material is based on the general chemical formula $Li_2Mn_{1-z}M_zO_3$, where z is in a range of greater than 0 to lesser than 1, in particular in a range of greater than or equal to 0.01 to lesser than or equal to 0.3, and most particularly in a range of greater than or equal to 0.01 to less than or equal to 0.2 and M is the redox-active element.

As explained at the outset, HE-NCM materials are particularly suited as electrode materials, since they supply particularly high start voltages. Merely as an example, the first lithiatable active material may be implemented as NCM material $LiMn_{1/3}Ni_{1/3}Co_{1/3}O_2$, which, through doping with a redox-active element M and adding additional lithium and/or additional manganese and additional oxygen ions for charging compensation, has areas which form the second lithiatable active material and which may include, for example, $Li_2Mn_{1-z}M_zO_3$, which may be structurally integrated into the NCM material. In particular the previously mentioned doped $Li_2Mn_{1-z}M_zO_3$-type areas of the second lithiatable active material may here effectuate a stabilization of the active material structure and an improvement of the discharging capacity.

It is furthermore advantageous if the redox-active element has at least one ionic radius, which is in a range of greater than or equal to 50 pm to less than or equal to 80 pm, in particular in a range of greater than or equal to 60 pm to less than or equal to 70 pm, most particularly in a range of greater than or equal to 65 pm to less than or equal to 69 pm. The ion radii here refer to values according to Shannon (see, for example, http://abulafia.mt.ic.ac.uk/shannon/ptable.php, as of Dec. 10, 2013). The expansion of the crystal lattice, for example, marked by an increase of the lattice parameters a, b and/or c during cyclization facilitates the migration of the transition metals. Test series have shown that elements having an ionic radius in a range of greater than or equal to 50 pm to less than or equal to 80 pm, in particular in a range of greater than or equal to 60 pm to less than or equal to 70 pm, most particularly in a range of greater than or equal to 65 pm to less than or equal to 69 pm, reduce the expansion of the crystal lattice and thus stabilize the electrode material.

It is furthermore advantageous if the redox-active element exhibits a small change of the ionic radius during at least two subsequent oxidation stages, i.e., while going through the redox-reaction, in particular if the redox-active element has an ionic radius which is respectively within a range of greater than or equal to 50 pm to less than or equal to 80 pm, in particular in a range of greater than or equal to 59 pm to less than or equal to 70 pm during at least two subsequent oxidation stages. Since a great change of the ionic radius during cyclization further facilitates the migration of the transition metals, the electrode material may be further stabilized with a small change of the ionic radius of the redox-active element.

It is furthermore advantageous if the redox-active element is furthermore a transition metal. Unlike the metals of the main group, the transition metals have largely d-orbitals which are not occupied completely. This often results in additional oxidation stages which the transition metal may occupy. Furthermore, in particular the lithium layered oxides of the transition metals Ni, Co and Mn offer electrochemical potentials which are of interest for automotive applications (which may be high voltages and high capacity).

It is furthermore advantageous if the at least one redox-active element is niobium, in particular niobium(IV) or tungsten, in particular tungsten(IV), or molybdenum, in particular molybdenum(IV). Nb(IV), W(IV) and Mo(IV) may be used insofar as they have a very similar ionic radius to tin(IV), which is known as a structure stabilizer, which, however, is redox-active with a minimal change to the ionic radius. HE-NCM materials are only activated during formation, during which oxygen is irreversibly split off. Thus in an HE-NCM it may be the case to replace in the second lithiatable active material (for example $Li_2MnO_3$), which is initially electrochemically still inactive, the Mn(IV) may be proportionally replaced with an electrochemically active doping element, for example, Nb(IV), W(IV) or Mo(IV). In this way, the required activation of the material and thus the irreversible loss of oxygen of the material decrease. This stabilizes the structure and thus the voltage, since fewer defects occur in the electrode material via which the transition metals (primarily Ni and Mn) may later migrate and thus change or destabilize the structure. Consequently, an HE-NCM doped with niobium, tungsten or molybdenum may be provided which, compared to HE-NCM doped with tin, links the structurally stabilizing advantages of tin with a gain in start voltage and start capacity.

The mixture or compound generated may thus, for example, be based on the general chemical formula $x(Li(Ni, Co, Mn)O_2):1-x(Li_2Mn_{1-z}M_zO_3)$, where x and z are respectively in a range of greater than 0 to less than 1, and M stands for Nb, W or Mo, for example. However, a mixture of NCM with other tungsten, molybdenum or niobium oxides is also conceivable. For x a range of greater than or equal to 0.2 to less than or equal to 0.7 is particularly used, and a range of greater than or equal to 0.3 to less than or equal to 0.55 may most particularly be used.

The object of the present invention is furthermore a method for manufacturing such an electrode material including the following:
  providing at least one first lithiatable active material, which is based on a transition metal oxide;
  providing at least one second lithiatable active material which is based on a doped transition metal oxide, the doped transition metal oxide of the second lithiatable active material being doped with at least one redox-active element;
  if necessary, adding a conductive additive;
  if necessary, adding a binder; and
  if necessary, coating the material particles with, for example, $Al_2O_3$, $AlF_3$, $LiAlO_x$, $ZrO_2$, $TiO_2$, $AlPO_4$, LiPON (lithium phosphorous oxynitride) or any other compounds, which decrease dissolving of the transition metal and other material-electrolyte interactions ("single particle coating").

The object of the present invention is furthermore a method for manufacturing a cathode including such an electrode material, the method including the following, additional steps:
  dry pressing of at least one component of the group including the first lithiatable active material, the second lithiatable active material, the conductive additive and the binder, or dispersion of at least one component of the group including the first lithiatable active material, the second lithiatable active material, the conductive additive and the binder in one solvent, in particular in N-methyl-2-pyrrolidone;
  if necessary, applying the thus obtained dispersion under shear stress by spreading onto an aluminum foil;
  if necessary, drying of the dispersion; and
  if necessary, coating the electrode with, for example, $Al_2O_3$, $AlF_3$, $LiAlO_x$, $ZrO_2$, $TiO_2$, $AlPO_4$, LiPON (lithium phosphorous oxynitride) or any other compounds, which decrease dissolving of the transition metal and other material-electrolyte interactions ("laminate coating").

In one exemplary embodiment, the synthesis may be carried out as follows using a co-precipitation method:
  Ni, Co, Mn and Nb salt+$Na_2CO_3$+$NH_4OH$ (chelate former)
  50° C. water bath 12 h
  Mixing with LiOH
  Calcinating and quenching in liquid $N_2$ However, other synthesis methods known to those skilled in the art may also be used to manufacture inorganic solid state compounds, for example, direct thermal solid-solid reactions, reactions in melts and others, which may optionally also be supplemented by subsequent comminution methods, for example, ball milling.

Such a method may be used in particular to manufacture an electrode material for an electrochemical energy store. This may have the advantages which were explained with reference to the electrode material, in particular. In summary, an energy store of this type may offer advantages regarding the voltage and the capacity.

What is claimed is:

1. An electrode material for an electrochemical energy store, comprising:
  at least one first lithiatable active material which is based on a transition metal oxide; and
  at least one second lithiatable active material, which is based on a doped transition metal oxide;
  wherein the doped transition metal oxide of the second lithiatable active material is doped with at least one redox-active element, and
  wherein the electrode material is based on the general chemical formula $x(Li(Ni, Co, Mn)O_2):1-x(Li_2Mn_{1-z}M_zO_3)$, where x and z are respectively in a range of greater than 0, to smaller than 1, and M is the redox-active element.

2. An electrode material for an electrochemical energy store, comprising:
  at least one first lithiatable active material which is based on a transition metal oxide; and
  at least one second lithiatable active material, which is based on a doped transition metal oxide,
  wherein the doped transition metal oxide of the second lithiatable active material is doped with at least one redox active element,
  wherein the first lithiatable active material is based on the general chemical formula $Li(Ni_xCo_yMn_{1-x-y})O_2$, where x is in a range of greater than 0 to less than or equal to 1, and y is in a range of greater than 0 to less than or equal to 1, and
  wherein the second lithiatable active material is based on a doped manganese-oxide is based on the general chemical formula $Li_2Mn_{1-z}M_zO_3$, where z is in a range of greater than 0 to less than 1, and M is the redox-active element.

3. The electrode material of claim 1, wherein the second lithiatable active material is based on a doped manganese-oxide.

4. The electrode material of claim 1, wherein the redox-active material has at least an ionic radius which is within the range of greater than or equal to 50 pm to less than or equal to 80 pm.

5. The electrode material of claim 1, wherein the redox-active element exhibits a small change of the ionic radius during at least two subsequent oxidation stages.

6. The electrode material of claim 1, wherein the redox-active element is also a transition metal.

7. The electrode material of claim 1, wherein the at least one redox-active element includes niobium, tungsten, or molybdenum.

8. The electrode material for an electrochemical energy store, comprising:
an electrode material which is obtainable via synthesis of at least one first lithiatable active material, which is based on a transition metal oxide, having at least one second lithiatable active material, which is based on a doped transition metal oxide;
wherein the doped transition metal oxide of the second lithiatable active material is doped with at least one redox-active element, and
wherein the electrode material is based on the general chemical formula x(Li(Ni, Co, Mn)O$_2$):1-x(Li$_2$Mn$_{1-z}$M$_z$O$_3$), where x and z are respectively in a range of greater than 0, to smaller than 1, and M is the redox-active element.

9. An electrode, comprising:
at least one electrode material for an electrochemical energy store, including:
at least one first lithiatable active material which is based on a transition metal oxide; and
at least one second lithiatable active material, which is based on a doped transition metal oxide;
wherein the doped transition metal oxide of the second lithiatable active material is doped with at least one redox-active element, and
wherein the electrode material is based on the general chemical formula x(Li(Ni, Co, Mn)O$_2$):1-x(Li$_2$Mn$_{1-z}$M$_z$O$_3$), where x and z are respectively in a range of greater than 0, to smaller than 1, and M is the redox-active element.

10. The electrode material of claim 1, wherein the electrochemical energy store includes a lithium cell.

11. An electrode material for an electrochemical energy store, comprising:
at least one first lithiatable active material which is based on a transition metal oxide; and
at least one second lithiatable active material, which is based on a doped transition metal oxide;
wherein the doped transition metal oxide of the second lithiatable active material is doped with at least one redox-active element, and
wherein the second lithiatable active material is based on a doped manganese-oxide is based on the general chemical formula Li$_2$Mn$_{1-z}$M$_z$O$_3$, where z is in a range of greater than 0 to less than 1, and M is the redox-active element.

12. The electrode material of claim 11, wherein z is in a range of greater than or equal to 0.01 to less than or equal to 0.3.

13. The electrode material of claim 11, wherein z is in a range of greater than or equal to 0.01 to less than or equal to 0.2.

14. The electrode material of claim 1, wherein the redox-active material has at least an ionic radius which is within the range of than or equal to 60 pm to less than or equal to 70 pm.

15. The electrode material of claim 1, wherein the redox-active material has at least an ionic radius which is within the range of greater than or equal to 65 pm to less than or equal to 69 pm.

16. The electrode material of claim 1, wherein the redox-active element exhibits a small change of the ionic radius during at least two subsequent oxidation stages, in particular the redox-active material exhibiting in at least two subsequent oxidation stages a small change of the ionic radius which is respectively in a range of greater than or equal to 50 pm to less than or equal to 80 pm.

17. The electrode material of claim 1, wherein the redox-active element exhibits a small change of the ionic radius during at least two subsequent oxidation stages, in particular the redox-active material exhibiting in at least two subsequent oxidation stages a small change of the ionic radius which is respectively in a range of greater than or equal to 59 pm to less than or equal to 70 pm.

18. An electrode material for an electrochemical energy store, comprising:
at least one first lithiatable active material which is based on a transition metal oxide; and
at least one second lithiatable active material, which is based on a doped transition metal oxide;
wherein the doped transition metal oxide of the second lithiatable active material is doped with at least one redox-active element, and
wherein the at least one redox-active element includes niobium(IV).

19. The electrode material of claim 8, wherein the electrochemical energy store includes a lithium cell.

20. The electrode of claim 9, wherein the electrode is a cathode.

21. The electrode of claim 9, wherein the electrode material further includes a conductive additive.

22. The electrode of claim 9, wherein the electrode material further includes a binder.

23. The electrode of claim 9, wherein:
the electrode material further includes at least one of (a) a conductive additive and (b) a binder;
at least one of the first lithiatable active material, the second lithiatable active material, the conductive additive, and the binder is dry pressed or solvent dispersed.

24. The electrode of claim 9, wherein:
the electrode material further includes at least one of (a) a conductive additive and (b) a binder;
at least one of the first lithiatable active material, the second lithiatable active material, the conductive additive, and the binder is solvent dispersed and spread on an aluminum foil.

25. The electrode of claim 9, wherein:
the electrode is a cathode;
the electrode material further includes at least one of (a) a conductive additive and (b) a binder; and
at least one of the first lithiatable active material, the second lithiatable active material, the conductive additive, and the binder is N-methyl-2-pyrrolidone solvent dispersed.

26. The electrode material of claim 1, further comprising a conductive additive.

27. The electrode material of claim 1, further comprising a binder.

\* \* \* \* \*